US012305587B2

(12) United States Patent
Toya

(10) Patent No.: US 12,305,587 B2
(45) Date of Patent: May 20, 2025

(54) CONTROLLER FOR INTERNAL COMBUSTION ENGINE

(71) Applicant: TOYOTA JIDOSHA KABUSHIKI KAISHA, Toyota (JP)

(72) Inventor: Masanori Toya, Inazawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/814,643

(22) Filed: Aug. 26, 2024

(65) Prior Publication Data

US 2025/0109719 A1 Apr. 3, 2025

(30) Foreign Application Priority Data

Sep. 29, 2023 (JP) ................................ 2023-169139

(51) Int. Cl.
*F02D 41/14* (2006.01)
*F02D 41/00* (2006.01)
*F02D 41/40* (2006.01)

(52) U.S. Cl.
CPC ..... *F02D 41/1498* (2013.01); *F02D 41/0027* (2013.01); *F02D 41/401* (2013.01)

(58) Field of Classification Search
CPC . F02D 41/1498; F02D 41/0027; F02D 41/401
See application file for complete search history.

(56) References Cited

U.S. PATENT DOCUMENTS

| | | | | |
|---|---|---|---|---|
| 4,319,552 | A * | 3/1982 | Sauer | H01T 13/54 123/297 |
| 10,519,877 | B2 * | 12/2019 | Stockner | F02D 41/22 |
| 10,876,488 | B2 * | 12/2020 | Fujiwara | F02D 35/023 |
| 2011/0125387 | A1 * | 5/2011 | Suzuki | F02M 59/466 123/294 |
| 2011/0214639 | A1 * | 9/2011 | Ishida | F02M 21/0254 123/275 |
| 2015/0337781 | A1 * | 11/2015 | Hartwick | F02D 41/0027 123/472 |
| 2018/0112606 | A1 * | 4/2018 | Huang | F02D 41/22 |
| 2018/0252174 | A1 * | 9/2018 | Hagiwara | F02D 19/0657 |
| 2021/0087981 | A1 * | 3/2021 | Wang | F02D 41/0027 |
| 2024/0110534 | A1 * | 4/2024 | Suzuki | F02D 41/0027 |

FOREIGN PATENT DOCUMENTS

JP 2012-189062 A 10/2012

* cited by examiner

*Primary Examiner* — Carl C Staubach
(74) *Attorney, Agent, or Firm* — Oblon, McClelland, Maier & Neustadt, L.L.P.

(57) ABSTRACT

Processing circuitry controls a fuel injection amount of a direct injection valve provided in an internal combustion engine that uses hydrogen as fuel. An amount of combustion gas that flows back into the direct injection valve due to occurrence of pre-ignition is defined as a backflow amount. A single combustion cycle starting from a cylinder where fuel injection is performed subsequent to a cylinder where the pre-ignition has occurred is referred to as a subsequent cycle. The processing circuitry is configured to execute a process that reduces the fuel injection amount in the subsequent cycle when the backflow amount is relatively small compared with when the backflow amount is relatively large.

4 Claims, 3 Drawing Sheets

CONTROLLER FOR INTERNAL COMBUSTION ENGINE

CROSS-REFERENCE TO RELATED APPLICATIONS

This application is based upon and claims the benefit of priority from prior Japanese Patent Application No. 2023-169139, filed on Sep. 29, 2023, the entire contents of which are incorporated herein by reference.

BACKGROUND

1. Field

The present disclosure relates to a controller for an internal combustion engine.

2. Description of Related Art

In an internal combustion engine, when pre-ignition occurs, the in-cylinder pressure becomes excessively high. This causes the hot combustion gases to flow back into the fuel injection valve, potentially damaging the fuel injection valve.

Japanese Laid-Open Patent Publication No. 2012-189062 discloses an example of an internal combustion engine. In this engine, when the occurrence of pre-ignition is predicted, the occurrence of pre-ignition is suppressed by cooling the inside of the cylinder using the latent heat of vaporization of the fuel.

In an internal combustion engine that uses hydrogen as fuel, it is difficult to cool the inside of the cylinder using the latent heat of vaporization of the fuel. Thus, a method similar to the one described in the above document cannot suppress the occurrence of pre-ignition.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a controller for an internal combustion engine. The internal combustion engine includes a fuel injection valve that injects hydrogen as fuel. The controller includes processing circuitry that controls a fuel injection amount from the fuel injection valve. An amount of combustion gas that flows back into the fuel injection valve due to occurrence of pre-ignition is defined as a backflow amount. Further, a single combustion cycle starting from a cylinder where fuel injection is performed subsequent to a cylinder where the pre-ignition has occurred is referred to as a subsequent cycle. The processing circuitry is configured to execute a process that reduces the fuel injection amount in the subsequent cycle when the backflow amount is relatively small compared with when the backflow amount is relatively large.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, “at least one of A and B” should be understood to mean “only A, only B, or both A and B.”

A controller for an internal combustion engine according to an embodiment will now be described with reference to FIGS. 1 and 2.

Configuration of Internal Combustion Engine

Figure 1:
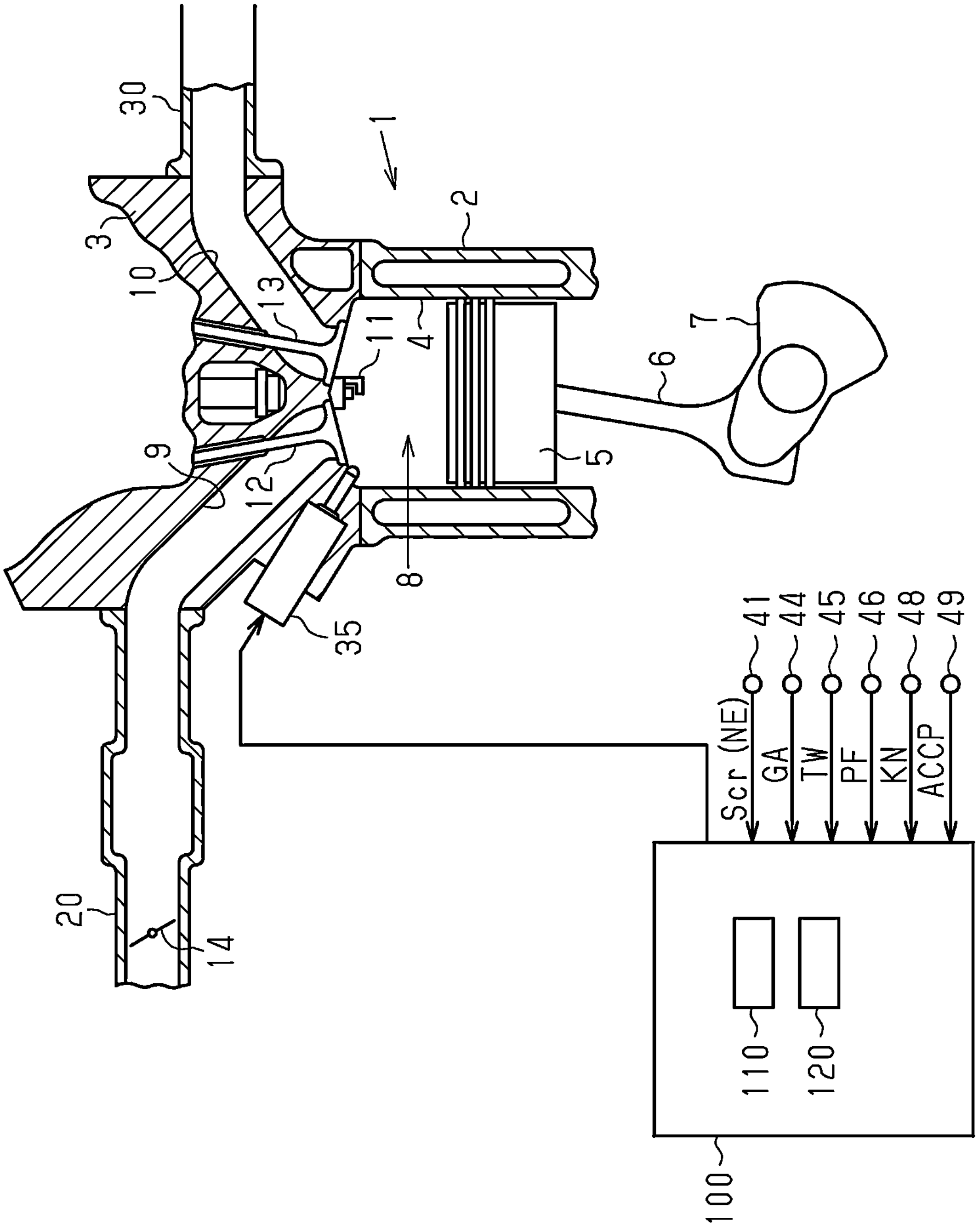
FIG. 1 is a schematic diagram of an internal combustion engine according to an embodiment.

As shown in FIG. 1, a cylinder 4 is provided in a cylinder block 2 of an internal combustion engine 1. A piston 5 is installed inside a cylinder 4. The piston 5 is connected to a crankshaft 7 by a connecting rod 6.

A cylinder head 3 is coupled to an upper portion of the cylinder block 2. In each cylinder 4, a combustion chamber 8 is defined between the top surface of the piston 5 and the cylinder head 3. The cylinder head 3 includes a direct injection valve 35 and an ignition plug 11 that are disposed in each cylinder in the internal combustion engine 1. The direct injection valve 35 is a fuel injection valve that directly injects hydrogen gas, which is fuel for the internal combustion engine 1, into the cylinder. The ignition plug 11 performs spark-ignition for air-fuel mixture in the combustion chamber 8.

The cylinder head 3 further includes an intake port 9 and an exhaust port 10 that are connected to the combustion chamber 8. The intake port 9 is part of an intake passage through which intake air flows.

The intake port 9 is connected to an intake passage 20 provided with a throttle valve 14 that regulates an intake air amount. The intake port 9 includes an intake valve 12 that opens and closes the intake port 9.

The exhaust port 10 includes an exhaust valve 13 that opens and closes the exhaust port 10. The exhaust port 10 is connected to an exhaust passage 30.

Controller

The controller 100 includes, for example, a CPU 110 and a memory 120 that stores control programs and data. The CPU 110 executes the programs stored in the memory 120 to execute, for example, various types of engine control.

Various sensors are connected to the controller 100. For example, a crank angle sensor 41 that detects the rotation angle of the crankshaft 7, an air flow meter 44 that measures an intake air amount GA, and a water temperature sensor 45 that detects a coolant temperature TW, which is the temperature of coolant in the internal combustion engine 1, are connected to the controller 100. Further, a fuel pressure sensor 46 that detects a fuel pressure PF, which is the pressure of fuel supplied to the direct injection valve 35, are connected to the controller 100. Furthermore, for example, a knocking sensor 48 that is a vibration sensor that outputs an output signal KN corresponding to the amplitude of vibration of the cylinder 4 and an accelerator sensor 49 that detects an accelerator operation amount ACCP, which is the operation amount of the accelerator pedal, are connected to the controller 100.

The controller 100 calculates an engine rotation speed NE based on an output signal Scr of the crank angle sensor 41. In addition, the controller 100 calculates an engine load factor KL based on the engine rotation speed NE and the intake air amount GA. The engine load factor KL represents the ratio of the current cylinder inflow air amount to the cylinder inflow air amount that is obtained when the internal combustion engine 1 is in a steady operational state with the throttle valve 14 fully open at the current engine rotation speed NE. The cylinder inflow air amount is the amount of air that flows into each cylinder in the intake stroke.

The controller 100 performs various engine controls, including an open degree control for the throttle valve 14, an injection control for the fuel injected from the direct injection valve 35, and an ignition control for the ignition plug 11.

For example, the controller 100 calculates the requested output of the internal combustion engine 1 based on, for example, the accelerator operation amount ACCP. Then, the controller 100 calculates the requested injection amount Qd from which the desired output can be obtained, and substitutes the requested injection amount Qd into the fuel injection amount Qa of the direct injection valve 35. The controller 100 controls the driving of the direct injection valve 35 such that the fuel corresponding to the fuel injection amount Qa is injected from the direct injection valve 35.

Additionally, the controller 100 executes a process that determines the occurrence of pre-ignition based on the output signal KN from the knocking sensor 48. The determination process for pre-ignition is known. For example, when the value generated from the output signal KN is greater than or equal to a predetermined threshold value, it can be determined that pre-ignition has occurred. Hereinafter, the term "pre-ignition" will be referred to as "pre-ig."

Suppression of Pre-ig

The controller 100 performs the following processes to suppress the occurrence of pre-ig.

Figure 2:
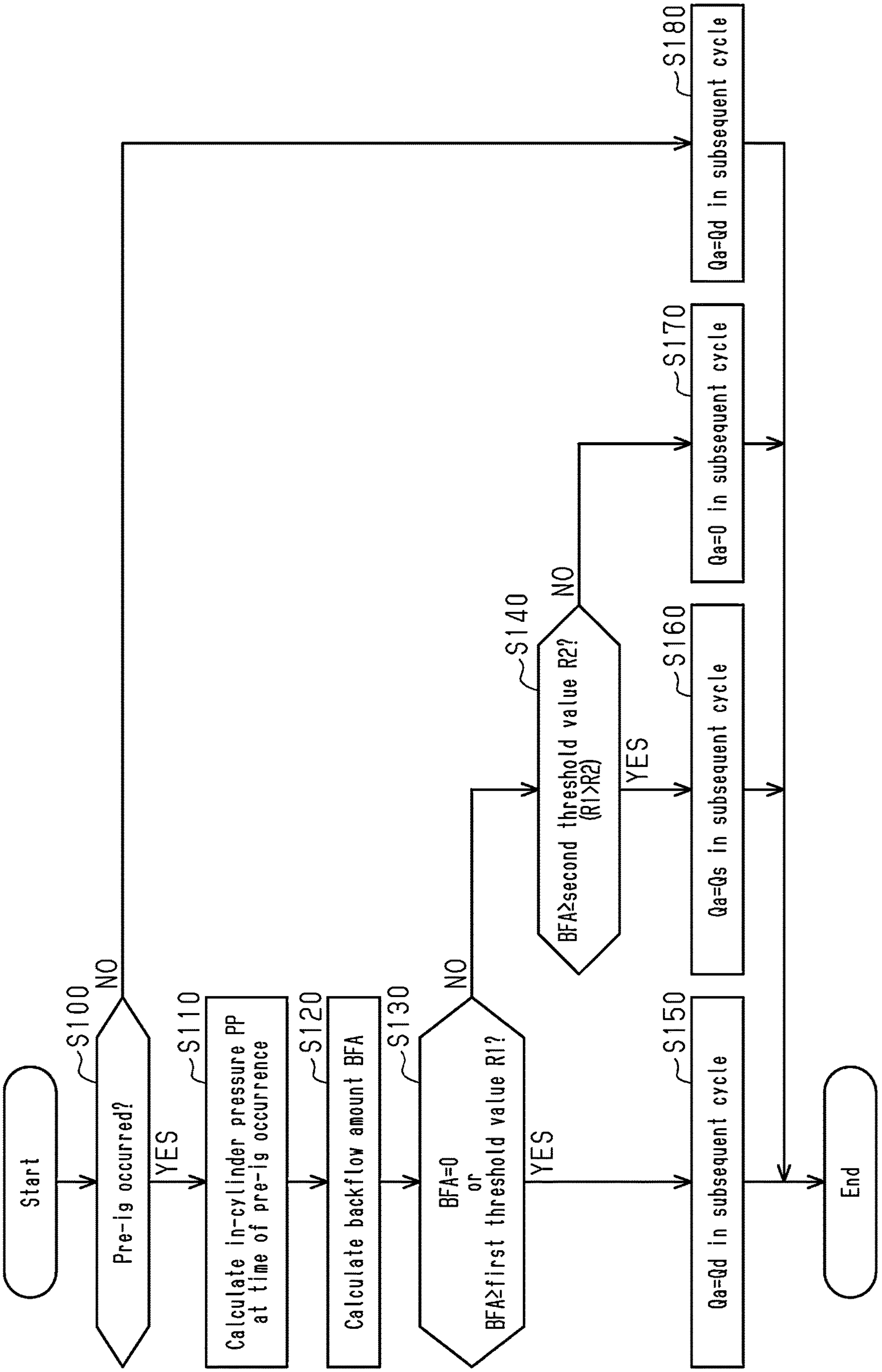
FIG. 2 is a flowchart illustrating the procedure of processes executed by the controller.
Figure 3:
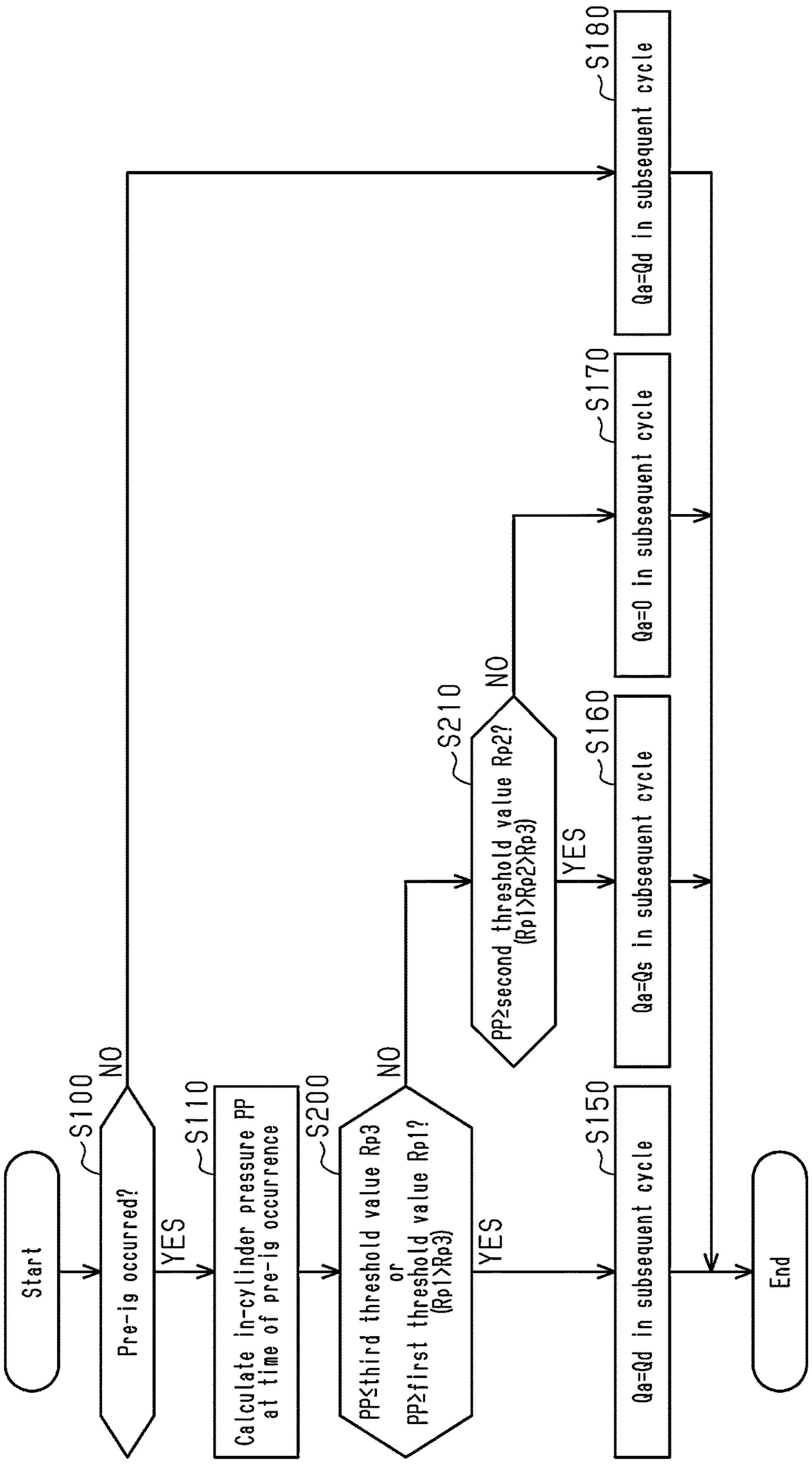
FIG. 3 is a flowchart illustrating the procedure of processes executed by the controller in a modification of the embodiment.

FIG. 2 illustrates a procedure for processes executed by the controller 100. The processes illustrated in FIG. 2 are implemented by the CPU 110 executing the program stored in the memory 120. The processes illustrated in FIG. 3 is repeatedly executed at predetermined intervals. In the following description, the number of the step in each process is represented by the letter S followed by a numeral.

When the series of processes shown in FIG. 2 begins, the controller 100 determines whether pre-ig has occurred (S100). In the process of S100, the controller 100 refers to the result of the pre-ig determination process described above.

When determining that pre-ig has occurred (S100: YES), the controller 100 calculates an in-cylinder pressure PP at the time of pre-ig occurrence in the cylinder where pre-ig has occurred (S110). In the process of S110, the controller 100 calculates the in-cylinder pressure PP using, for example, as follows. The controller 100 retrieves the pre-stored engine rotation speed NE and engine load factor KL from the memory 120. It is desirable to store the values of the engine rotation speed NE and fuel pressure PF at the time of pre-ig occurrence. The controller 100 calculates the in-cylinder pressure PP by referring to a two-dimensional map stored in the memory 120, based on the engine rotation speed NE and engine load factor KL at the time of pre-ig occurrence. Basically, the calculated in-cylinder pressure PP becomes higher as the engine rotation speed NE increases, and the calculated in-cylinder pressure PP becomes higher as the engine load factor KL increases.

Next, the controller 100 calculates a backflow amount BFA (S120). The backflow amount BFA refers to the amount of combustion gas that flows back into the direct injection valve 35 due to the occurrence of pre-ig.

In the process of S120, the controller 100 calculates the backflow amount BFA, for example, as follows. The controller 100 retrieves the pre-stored engine rotation speed NE and fuel pressure PF from the memory 120. It is desirable to store the values of the engine rotation speed NE and fuel pressure PF at the time of pre-ig occurrence. The controller 100, based on the engine rotation speed NE and fuel pressure PF and based on the calculated in-cylinder pressure PP, refers to a three-dimensional map stored in the memory 120 to find the backflow amount BFA, thereby calculating the backflow amount BFA. Basically, as the engine rotation speed NE increases, the duration for which the injection holes of the direct injection valve 35 are exposed to high pressure becomes shorter. Consequently, the backflow amount BFA tends to decrease. Further, as the fuel pressure PF increases, the force closing the valve member of the direct injection valve 35 becomes stronger. Consequently, the backflow amount BFA tends to decrease. Furthermore, as the in-cylinder pressure PP increases, the force opening the valve member of the direct injection valve 35 becomes stronger. Consequently, the backflow amount BFA tends to increase. Accordingly, the three-dimensional map for calculating the backflow amount BFA is designed to align with these tendencies of the backflow amount BFA.

Next, the controller 100 determines whether the calculated backflow amount BFA is 0 or whether the calculated backflow amount BFA is greater than or equal to a predetermined first threshold value R1 (S130). The first threshold value R1 is set at a value that can accurately determine that the backflow amount BFA is large enough to necessitate sufficient scavenging within the direct injection valve 35 based on the backflow amount BFA being greater than or equal to the first threshold value R1.

When an affirmative determination is made in the process of S130 (S130: YES), the controller 100 executes a process that substitutes the above-described requested injection amount Qd into the fuel injection amount Qa to set the fuel injection amount Qa in a subsequent cycle (S150). The subsequent cycle is a single combustion cycle starting from a cylinder where fuel injection is performed subsequent to a cylinder where pre-ig has occurred.

When a negative determination is made in the process of S130 (S130: NO), that is, when the backflow amount BFA is greater than 0 and less than the first threshold value R1, the controller 100 executes the process of S140.

In the process of S140, the controller 100 determines whether the calculated backflow amount BFA is greater than or equal to a second threshold value R2. The second threshold value R2 is greater than 0 and less than the first threshold value R1. The second threshold value R2 is set at a value that can accurately determine that the backflow amount BFA necessitates scavenging within the direct injection valve 35 based on the backflow amount BFA being greater than or equal to the second threshold value R2.

When an affirmative determination is made in the process of S140 (S140: YES), that is, when the backflow amount BFA is less than the first threshold value R1 and greater than or equal to the second threshold value R2, the controller 100 executes process of S160.

In the process of S160, the controller 100 executes a process that substitutes a small injection amount Qs into the fuel injection amount Qa to set the fuel injection amount Qa in the subsequent cycle. The small injection amount Qs is the fuel injection amount at which the hydrogen concentration of the air-fuel mixture is less than a combustible concentration.

When a negative determination is made in step S140 (S140: NO), that is, when the backflow amount BFA is less than the second threshold value R2 and is greater than 0, the controller 100 executes the process of S170.

In the process of S170, the controller 100 executes a process that substitutes 0 into the fuel injection amount Qa to set the fuel injection amount Qa in the subsequent cycle. In other words, the system executes a process that executes fuel cut-off in the subsequent cycle.

When a negative determination is made in the process of S100 (S100: NO), the controller 100 executes a process that substitutes the above-described requested injection amount Qd into the fuel injection amount Qa to set the fuel injection amount Qa in the subsequent cycle (S180).

When any one of S150, S160, S170, and S180 is executed, the controller 100 terminates the present process in the present execution cycle.

Operation of Present Embodiment

When the backflow amount (BFA) is 0 and it is estimated that there is no backflow of combustion gas into the direct injection valve 35, an affirmative determination is made in the process of S130. When the affirmative determination is made in the process of S130, the controller 100 executes the process that substitutes the requested injection amount Qd into the fuel injection amount Qa to set the fuel injection amount Qa in the subsequent cycle (S150). In other words, a normal fuel injection control is executed.

Further, when it is determined that the amount of combustion gas that has flowed back into the direct injection valve 35 is greater than or equal to the first threshold value R1 (i.e., when an affirmative determination is made in step S130), the controller 100 executes the process of step S150. In the process of S150, the controller 100 executes the process that substitutes the requested injection amount Qd into the fuel injection amount Qa to set the fuel injection amount Qa in the subsequent cycle. That is, the controller 100 executes a normal fuel injection control. The normal fuel injection control causes the direct injection valve 35 to inject the amount of fuel equivalent to the requested injection amount Qd. Thus, even if combustion gas flows back and remains inside the direct injection valve 35 of the cylinder where pre-ig has occurred, the fuel injection in the subsequent cycle will scavenge such combustion gas.

Furthermore, when the backflow amount BFA is less than the first threshold value R1 and greater than 0 (i.e., when the backflow amount BFA is less than the first threshold value R1 and a negative determination is made in step S130), the controller 100 executes the process of step S160 or step S170. In the process of S160, the process that substitutes the small injection amount Qs into the fuel injection amount Qa is executed to set the fuel injection amount Qa in the subsequent cycle. Therefore, the fuel injection amount Qa in the subsequent cycle is reduced when the backflow amount BFA is less than the first threshold value R1 compared with when the backflow amount BFA is greater than or equal to the first threshold value R1.

Additionally, in the process of S170, the process that substitutes 0 into the fuel injection amount Qa is executed to set the fuel injection amount Qa in the subsequent cycle. Therefore, in the process of S170 as well, the fuel injection amount Qa in the subsequent cycle is reduced when the backflow amount BFA is less than the first threshold value R1 compared with when the backflow amount BFA is greater than or equal to the first threshold value R1.

Advantages of Present Embodiment (1) The controller 100 controls the fuel injection amount Qa of the direct injection valve 35, which injects hydrogen as fuel. The amount of combustion gas that flows back into the direct injection valve 35 due to the occurrence of pre-ig is defined as the backflow amount BFA. A single combustion cycle starting from a cylinder where fuel injection is performed subsequent to a cylinder where pre-ig has occurred is referred to as the subsequent cycle. The controller 100 executes the process that reduces the fuel injection amount Qa in the subsequent cycle when the backflow amount BFA is relatively small compared with when the backflow amount BFA is relatively large.

In the present embodiment, when the backflow amount BFA of combustion gas is relatively small and the potential for damage to the direct injection valve 35 is relatively low, the fuel injection amount Qa in the subsequent cycle is reduced. Accordingly, pre-ig is less likely to occur in the subsequent cycle.

(2) Since pre-ig is less likely to occur in the subsequent cycle, the damage to the direct injection valve 35 caused by the backflow of combustion gas resulting from the occurrence of pre-ig is reduced.

(3) Since pre-ig is less likely to occur in the subsequent cycle, pre-ig is less likely to occur in a continuous manner.

(4) When the backflow amount BFA is greater than or equal to the first threshold value R1, a normal fuel injection control is executed. Thus, even if combustion gas flows back and remains inside the direct injection valve 35 of the cylinder where pre-ig has occurred, the fuel injection in the subsequent cycle will scavenge such combustion gas.

(5) When it is determined in the process of S140 that an affirmative determination is made, that is, when the backflow amount BFA is less than the first threshold value R1 and greater than or equal to the second threshold value R2, the controller 100 sets the fuel injection amount Qa such that the hydrogen concentration of the air-fuel mixture is less than the combustible concentration (S160). This ensures that pre-ig is less likely to occur in the subsequent cycle. Further, even if combustion gas flows back and remains inside the direct injection valve 35 of the cylinder where pre-ig has occurred, executing the fuel injection in the subsequent cycle will scavenge such combustion gas from the inside of the direct injection valve 35.

(6) When it is determined in the process of S140 that a negative determination is made, that is, when the backflow amount BFA is less than the second threshold value R2 and greater than or equal to 0, the controller 100 sets the fuel injection amount Qa to 0 (S170). This ensures that pre-ig is less likely to occur in the subsequent cycle. Moreover, since the fuel injection amount is set to 0, unlike the case where the fuel injection amount Qa is set such that the hydrogen concentration of the air-fuel mixture is less than the combustible concentration, unburned hydrogen is prevented from being discharged into the exhaust passage 30.

(7) The backflow amount BFA of combustion gas varies depending on the in-cylinder pressure PP of the cylinder where pre-ig has occurred. Thus, in the process of S120, the controller 100 calculates the backflow amount BFA based on the in-cylinder pressure PP of the cylinder where the pre-ig has occurred. This allows for accurate calculation of the backflow amount BFA.

Modifications

The above embodiment may be modified as follows. The above embodiment and the following modifications can be combined as long as the combined modifications remain technically consistent with each other.

The parameters used to calculate the backflow amount BFA include the engine rotation speed NE, fuel pressure PF, and in-cylinder pressure PP. However, one of the engine rotation speed NE and the fuel pressure PF may be excluded from the parameters. Alternatively, both the engine rotation speed NE and the fuel pressure PF may be excluded from the parameters.

The process of S140 shown in FIG. 2 is omitted. In this case, when a negative determination is made in the process of S130, the process of S160 may be executed.

The process of S140 shown in FIG. 2 is omitted. In this case, when a negative determination is made in the process of S130, the process of S170 may be executed.

The backflow amount BFA of combustion gas varies depending on the in-cylinder pressure PP of the cylinder in which pre-ig has occurred. Thus, the in-cylinder pressure PP may be used as a substitute value for the aforementioned backflow amount BFA.

FIG. 3 illustrates a procedure for processes executed using the aforementioned in-cylinder pressure PP as a substitute value for the backflow amount BFA. In FIG. 3, the same step numbers are given to the processes that are the same as those in FIG. 2.

As shown in FIG. 3, when the in-cylinder pressure PP is calculated in the process of S110, the controller 100 executes the process of S200.

In the process of step S200, the controller 100 determines whether the in-cylinder pressure PP is less than or equal to a third threshold value Rp3 or the in-cylinder pressure PP is greater than or equal to a first threshold value Rp1. The third threshold value Rp3 is a predetermined in-cylinder pressure PP at which the backflow amount BFA becomes 0. Additionally, the first threshold value Rp1 is a predetermined in-cylinder pressure PP at which the backflow amount BFA is the first threshold value R1. The first threshold value Rp1 is greater than the third threshold value Rp3.

Then, when an affirmative determination is made in process S200 (S200: YES), the controller 100 executes the process of S150.

When a negative determination is made in the process of S200 (S200: NO), the controller 100 executes the process of S210.

In the process of S210, the controller 100 determines whether the in-cylinder pressure PP is greater than or equal to a second threshold value Rp2. The second threshold value Rp2 is a predetermined in-cylinder pressure PP at which the backflow amount BFA is the second threshold value Rp2. The second threshold value Rp2 is greater than the third threshold value Rp3 and is less than the first threshold value Rp1.

Then, when an affirmative determination is made in process S210 (S210: YES), the controller 100 executes the process of S160.

When a negative determination is made in the process of S210 (S210: NO), the controller 100 executes the process of S170.

In such a modification, the accuracy of determination when selecting any one of the processes S150, S160, or S170 to switch the fuel injection amount Qa according to the backflow amount of exhaust gas is relatively low compared with when the above-described embodiment. However, similar operation and advantages as those of the above-described embodiment can be obtained.

The controller 100 includes the CPU 110 and the memory 120 and executes software processing. However, this is merely exemplary. For example, the controller 100 may include a dedicated hardware circuit (such as application specific integrated circuit (ASIC)) that executes at least part of the software processing executed in the above-described embodiment. That is, the controller 100 may be modified to have any one of the following configurations (a) to (c). (a) A configuration including a processor that executes all of the above-described processes according to programs and a program storage device such as a memory that stores the programs. (b) A configuration including a processor and a program storage device that execute part of the above-described processes according to the programs and a dedicated hardware circuit that executes the remaining processes. (c) A configuration including a dedicated hardware circuit that executes all of the above processes. A plurality of software circuits each including a processor and a program storage device and a plurality of dedicated hardware circuits may be provided. That is, the above processes may be executed in any manner as long as the processes are executed by processing circuitry that includes at least one of a set of one or more software circuits and a set of one or more dedicated hardware circuits. The program storage devices, or computer-readable media, include any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for an internal combustion engine, the internal combustion engine including a fuel injection valve that injects hydrogen as fuel, the controller comprising processing circuitry that controls a fuel injection amount from the fuel injection valve, wherein an amount of combustion gas that flows back into the fuel injection valve due to occurrence of pre-ignition is defined as a backflow amount, a single combustion cycle starting from a cylinder where fuel injection is performed subsequent to a cylinder where the pre-ignition has occurred is referred to as a subsequent cycle, the processing circuitry is configured to execute a process that reduces the fuel injection amount in the subsequent cycle when the backflow amount is relatively small compared with when the backflow amount is relatively large, and the processing circuitry is configured to set the fuel injection amount such that a hydrogen concentration of an air-fuel mixture is less than a combustible concentration when the backflow amount is less than a first threshold value and greater than or equal to a second threshold value, the second threshold value being smaller than the first threshold value.

2. The controller for the internal combustion engine according to claim 1, wherein the processing circuitry is configured to set the fuel injection amount to zero when the backflow amount is less than the second threshold value and greater than zero.

3. The controller for the internal combustion engine according to claim 1, wherein the processing circuitry is configured to execute a process that calculates the backflow amount based on an in-cylinder pressure of the cylinder where the pre-ignition has occurred.

4. The controller for the internal combustion engine according to claim 1, wherein the processing circuitry is configured to use an in-cylinder pressure of the cylinder where the pre-ignition has occurred as a substitute value for the backflow amount.

* * * * *